United States Patent
Zeng

(10) Patent No.: US 12,243,254 B2
(45) Date of Patent: Mar. 4, 2025

(54) OBJECT MEASUREMENT METHOD, VIRTUAL OBJECT PROCESSING METHOD, AND ELECTRONIC DEVICE

(71) Applicant: GUANGDONG OPPO MOBILE TELECOMMUNICATIONS CORP., LTD., Guangdong (CN)

(72) Inventor: Fantao Zeng, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 236 days.

(21) Appl. No.: 18/061,411

(22) Filed: Dec. 2, 2022

(65) Prior Publication Data

US 2023/0113647 A1    Apr. 13, 2023

Related U.S. Application Data

(63) Continuation of application No. PCT/CN2021/086654, filed on Apr. 12, 2021.

(30) Foreign Application Priority Data

Jun. 3, 2020   (CN) .......................... 202010495293.0

(51) Int. Cl.
*G06T 7/62* (2017.01)
*G06T 5/92* (2024.01)
(Continued)

(52) U.S. Cl.
CPC ............... *G06T 7/62* (2017.01); *G06T 5/92* (2024.01); *G06T 7/12* (2017.01); *G06T 7/13* (2017.01);
(Continued)

(58) Field of Classification Search
None
See application file for complete search history.

(56) References Cited

U.S. PATENT DOCUMENTS 10,617,271 B2 * 4/2020 Lindh ..................... A47L 9/009
2014/0104413 A1   4/2014 McCloskey et al.
(Continued)

FOREIGN PATENT DOCUMENTS

CN        106705837        5/2017
CN        106813568        6/2017
(Continued)

OTHER PUBLICATIONS

EPO, Extended European Search Report for EP Application No. 21818887.8, Nov. 6, 2023.
(Continued)

*Primary Examiner* — Jwalant Amin
(74) *Attorney, Agent, or Firm* — Hodgson Russ LLP

(57) ABSTRACT

An object measurement method, a virtual object processing method, a computer-readable storage medium, and an electronic device, which relate to the field of measurement. The object measurement method comprises determining point cloud data of a scene based on a depth image of the scene; performing a plane segmentation process for the point cloud data, and determining surface information of an object in the scene; determining 3D vertex coordinates of the object in combination with the surface information of the object; and obtaining a measurement parameter of the object based on the 3D vertex coordinates of the object. In addition, a virtual object associated with the measurement parameters may also be generated, and the virtual object is displayed on an electronic device for viewing by a user. The method may improve the accuracy of object measurement.

15 Claims, 8 Drawing Sheets

(51) Int. Cl.
    *G06T 7/12*         (2017.01)
    *G06T 7/13*         (2017.01)
    *G06T 7/50*         (2017.01)
    *G06T 7/70*         (2017.01)
    *G06T 7/73*         (2017.01)
    *G06T 19/00*      (2011.01)
    *G06T 7/80*         (2017.01)

(52) U.S. Cl.
    CPC ................ *G06T 7/50* (2017.01); *G06T 7/70* (2017.01); *G06T 7/73* (2017.01); *G06T 19/006* (2013.01); *G06T 7/80* (2017.01); *G06T 2207/10024* (2013.01); *G06T 2207/10028* (2013.01); *G06T 2207/10048* (2013.01); *G06T 2207/20164* (2013.01)

(56) References Cited

U.S. PATENT DOCUMENTS

| | | | |
|---|---|---|---|
| 2014/0300941 A1* | 10/2014 | Chang | G03H 1/0808 359/9 |
| 2014/0351073 A1 | 11/2014 | Murphy et al. | |
| 2015/0187067 A1 | 7/2015 | Bendall et al. | |
| 2018/0218513 A1 | 8/2018 | Ho | |
| 2019/0130636 A1 | 5/2019 | Bendall et al. | |
| 2019/0213389 A1* | 7/2019 | Peruch | G01B 11/00 |
| 2020/0077383 A1* | 3/2020 | Zhang | H04L 1/0003 |
| 2021/0142497 A1* | 5/2021 | Pugh | G06T 7/194 |

FOREIGN PATENT DOCUMENTS

| | | |
|---|---|---|
| CN | 108416804 | 8/2018 |
| CN | 108648230 | 10/2018 |
| CN | 109029253 | 12/2018 |
| CN | 109916301 | 6/2019 |
| CN | 110006340 | 7/2019 |
| CN | 110006343 | 7/2019 |
| CN | 110095062 | 8/2019 |
| CN | 111784765 | 10/2020 |

OTHER PUBLICATIONS

WIPO, International Search Report and Written Opinion for PCT/CN2021/086654, Jun. 24, 2021.

CNIPA, Second Office Action for CN Application No. 202010495293.0, Jan. 27, 2024.

CNIPA, First Office Action for CN Application No. 202010495293.0, Jul. 27, 2023.

* cited by examiner

OBJECT MEASUREMENT METHOD, VIRTUAL OBJECT PROCESSING METHOD, AND ELECTRONIC DEVICE

CROSS REFERENCE

The present disclosure is a continuation of International Patent Application No. PCT/CN2021/086654, filed Apr. 12, 2021, which claims priority to Chinese Patent Application No. 202010495293.0, filed Jun. 3, 2020, the entire disclosures of which are incorporated herein by reference.

TECHNICAL FIELD

The present disclosure relates to measurement technologies, and in particular to an object measurement method, a visual object processing method, and an electronic device.

BACKGROUND

In production and life, it is often necessary to measure objects in the real world. Measurements may be made manually using measuring tools such as tape measures, for example. This approach requires the measurer to carry a special measuring tool and record the measurement afterwards, which is a tedious and inefficient process.

With the development of AR (Augmented Reality) technology, AR measurement solutions have emerged. At present, in the AR measurement method, the deep learning method is usually configured to obtain the dimensional information of the object.

SUMMARY OF THE DISCLOSURE

According to a first aspect of the present disclosure, an object measurement method is provided and includes determining point cloud data of a scene based on a depth image of the scene; performing a plane segmentation process for the point cloud data and determining surface information of an object in the scene; determining 3D vertex coordinates of the object in combination with the surface information of the object; and obtaining a measurement parameter of the object based on the 3D vertex coordinates of the object.

According to a second aspect of the present disclosure, a virtual object processing method is provided and includes measuring a measurement parameter of an object in a scene based on the above object measurement method; and generating the virtual object associated with the measurement parameter of the object, so as to display the virtual object on the electronic device.

According to a third aspect of the present disclosure, an electronic device is provided and includes a processor and a memory. The memory is configured to store one or more programs, when the one or more programs are executed by the processor, the processor is configured to implement the above object measurement method or the above virtual object processing method.

DETAILED DESCRIPTION

Figure 1:
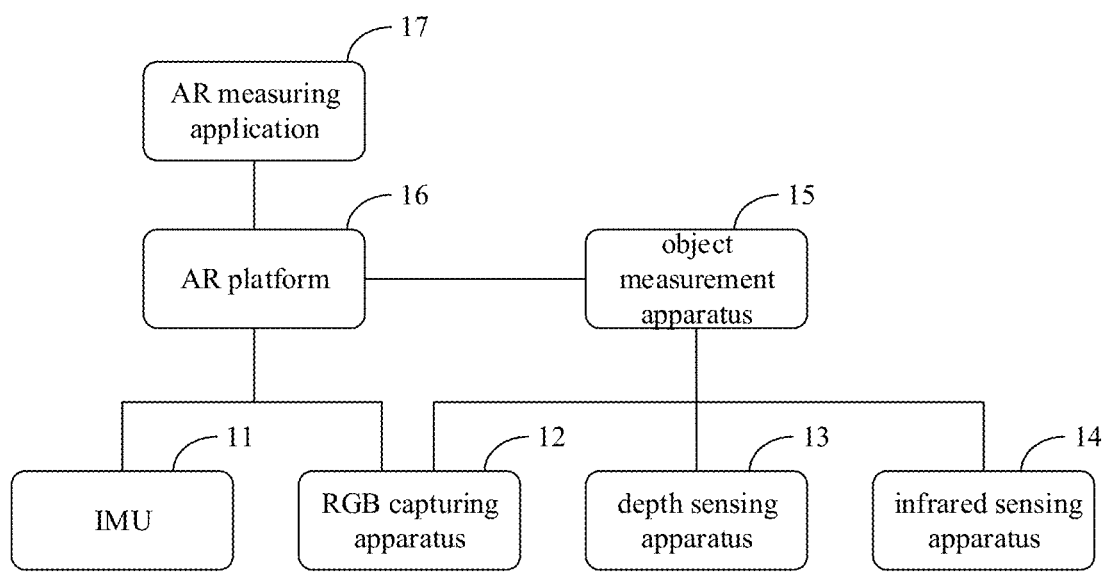
FIG. 1 is a schematic view of an exemplary system architecture for performing an AR measuring process according to some embodiments of the present disclosure.

Embodiments will be described more fully with reference to the accompanying drawings. However, the embodiments may be implemented in various ways and should not be construed to be limited to the embodiments described herein.

These embodiments are provided to make the present disclosure more comprehensive and complete, and communicate ideas of the embodiments to those skilled in the art in a comprehensive manner. Features, structures, or characteristics described may be combined in any suitable manner in one or more embodiments. In the following descriptions, many specific details are provided to give a full understanding of the embodiments of the present disclosure. However, those of skill in the art will realize that technical solutions of the present disclosure may be implemented by omitting one or more of particular details described, or by adopting other methods, components, devices, operations, etc. In other cases, well-known technical solutions are not shown or described in detail to avoid obscuring aspects of the present disclosure.

In addition, the accompanying drawings are only schematic illustrations of the present disclosure and are not necessarily drawn to scale. The same reference numerals of the accompanying drawings indicate the same or similar components, and thus repetitive descriptions will be omitted. Some blocks shown in the accompanying drawings are functional entities and do not necessarily have to correspond to physically or logically separate entities. These functional entities may be implemented in software forms, or in one or more hardware modules or integrated circuits, or in different networks and/or processor devices and/or microcontroller devices.

The flowcharts shown in the accompanying drawings are only exemplary illustrations and do not have to include all of the operations. For example, some of the operations may be divided, while some may be combined completely or partially. An actual executing sequence may vary based on actual situations. In addition, all of the following terms "first" and "second" are configured only for a purpose of distinction and should not be construed as limitations of the present disclosure.

FIG. 1 is a schematic view of an exemplary system architecture for performing an AR measuring process according to some embodiments of the present disclosure.

It should be understood that the system architecture for performing the AR measuring process described in the embodiments of the present disclosure may be deployed in an electronic device. The electronic device may be any device having an AR processing function, including but not limited to a cell phone, a tablet, AR glasses, an AR headset, etc.

As shown in FIG. 1, the system architecture for implementing the AR measuring process in the embodiments of the present disclosure may include an Inertial Measurement Unit (IMU) 11, an RGB capturing apparatus 12, a depth sensing apparatus 13, an infrared sensing apparatus 14, an object measurement apparatus 15, an AR platform 16, and an AR measuring application 17.

The IMU 11 may include a gyroscope configured to measure an angular velocity and an accelerometer configured to measure an acceleration of the electronic device. The RGB capturing apparatus 12 may be any camera capturing an RGB image, and a type of the RGB capturing apparatus 12 is not limited herein.

Since an operating frequency of the IMU 11 tends to be greater than a frequency of the RGB capturing apparatus 12, inertial information of a corresponding frame may be evaluated in a way of an IMU pre-integration. The IMU pre-integration is a time-based integration, configured to obtain the inertial information such as positions, speeds, and rotation angles corresponding to two images.

Posture information may be obtained through the IMU 11 and the RGB capturing apparatus 12 operating. The posture information may include, for example, 6 degrees of freedom (6DOF) posture information.

The depth sensing apparatus 13 may be an apparatus configured to generate a depth image of a scene. That is, the depth sensing apparatus 13 may be configured to collect depth information of an environment. The depth sensing apparatus depth sensing apparatus 13 may be, for example, a TOF (Time Of Flight) module, a structural light module or a binocular vision module.

The infrared sensing apparatus 14 may be an apparatus configured to generate an infrared image of the scene, and may be infrared sensors of various types.

The object measurement apparatus 15 may be an apparatus configured to measure an object in the scene in combination with depth data sensed by the depth sensing apparatus 13.

The AR platform 16 may be a platform constructed based on an existing AR engine (e.g., ARCore, ARKit, etc.).

The AR measuring application 17 may be an AR application for a human-computer interaction. A user may view the virtual object associated with measurement parameters of the object in the scene through a displaying scene corresponding to the AR application. In some instances, the user may also operate the virtual object.

In some embodiments, the object measurement apparatus 15 measures the object in the scene based on the depth image captured by the depth sensing apparatus 13. The object measurement apparatus 15 acquires the depth image in the scene captured by the depth sensing apparatus 13, and determines point cloud data of the scene based on the depth image. The object measurement apparatus 15 performs a plane segmentation process for the point cloud data and determines plane information in the scene, i.e., determines surface information of the object in the scene. The object measurement apparatus 15 determines 3D vertex coordinates of the object in combination with the surface information of the object, and obtains measurement parameters of the object based on the 3D vertex coordinates of the object.

In the present disclosure, the measurement parameters include one or more of length information, width information, height information, surface area information, or volume information of the object. In addition, the object to be measured in the present disclosure is generally a regular object. However, a person skilled in the art may associate that the object to be measured may also be an irregular object based on a conception of the solutions of the present disclosure, and the measurement solution for an irregular object using the idea of the present disclosure is also within the scope of protection of the present disclosure.

In the above embodiments, the measurement parameters of the object are obtained only based on the depth information. However, the depth sensing apparatus 13 may not capture all depth information of the object due to a possible reason such as a deep color of the surface of the object, a poor capturing angle, and a defective performance of the depth sensing apparatus 13, causing a determined vertex of the object being inaccurate.

In this case, the object measurement apparatus 15 may obtain the measurement parameters of the object by combining sensing results of the depth sensing apparatus 13 and the infrared sensing apparatus 14 in order to reduce a possibility of a problem that the vertex of the object is inaccurately identified only based on sensing data of the depth sensing apparatus 13.

In some embodiments, the object measurement apparatus 15 measures the object in the scene based on the depth image captured by the depth sensing apparatus 13 and the infrared image captured by the infrared sensing apparatus 14. The object measurement apparatus 15 acquires the depth image in the scene captured by the depth sensing apparatus 13, and determines the point cloud data of the scene based on the depth image. The object measurement apparatus 15 performs the plane segmentation process for the point cloud data and determines the surface information of the object in the scene. The object measurement apparatus 15 acquires the infrared image captured by the infrared sensing apparatus 14, extracts corner-point information of the object in the infrared image and straight line information, determines 2D vertex coordinates of the object in the infrared image based on the corner-point information and the straight line information, and calculates 3D vertex coordinates of the object under a coordinate system of the infrared sensing apparatus 14 based on the 2D vertex coordinates. The object measurement apparatus 15 determines 3D vertex coordinates of the object under a coordinate system of the depth sensing apparatus 13 based on the 3D vertex coordinates of the object under the coordinate system of the infrared sensing apparatus 14 and determined surface information of the object, and obtains the measurement parameters of the object based on the 3D vertex coordinates of the object under the coordinate system of the depth sensing apparatus 13.

In some embodiments, the object measurement apparatus 15 may also measure the measurement parameters of the object in combination with an image captured by the RGB capturing apparatus 12 and a sensing result of the depth sensing apparatus 13, so as to improve an accuracy of identifying the vertex of the object. Specifically, an image texture analyzing process may be performed for the RGB image captured by the RGB capturing apparatus 12 and determines 3D vertex coordinates of the object under a coordinate system of the RGB capturing apparatus 12, and the depth image captured by the depth sensing apparatus 13 is combined, such the 3D vertex coordinates configured to obtain the measurement parameters of the object may be obtained.

It should be understood that in some embodiments, in order to further obtain more accurate vertex coordinates of the object, the object measurement apparatus 15 may calculate measuring data of the object in combination with data send by the RGB capturing apparatus 12, the depth sensing apparatus 13, the infrared sensing apparatus 14, all of which fall within a scope of the present disclosure.

In some embodiments, after the object measurement apparatus 15 obtains the measurement parameters of the object, the virtual object associated with the measurement parameters may further be configured and displayed in on an interface of the AR measuring application of the electronic device.

For example, the measurement parameters may be displayed on the interface in a form of a virtual text for the user to view.

For another example, the object measurement apparatus 15 may send the 3D vertex coordinates of the object under the coordinate system of the depth sensing apparatus 13 and the measurement parameters to the AR platform 16. The AR platform 16 may convert the 3D vertex coordinates of the object under the coordinate system of the depth sensing apparatus 13 to coordinates under a coordinate system of the AR platform 16. In the AR measuring application 17, a rendering of an external 3D frame of the object may be achieved, and a virtual 3D frame may be displayed on the interface. It should be understood that in the AR measuring process, the virtual 3D frame is always externally connected to the object.

In some embodiments, the 3D vertex coordinates and/or the measurement parameters of the object may be stored in the electronic device or in cloud, so as to be directly acquired by the electronic device when the electronic device runs the AR measuring application 17 in a same scenario next time or other electronic devices may acquire the information when the electronic device running the AR measuring application 17 in a same scenario.

Figure 2:
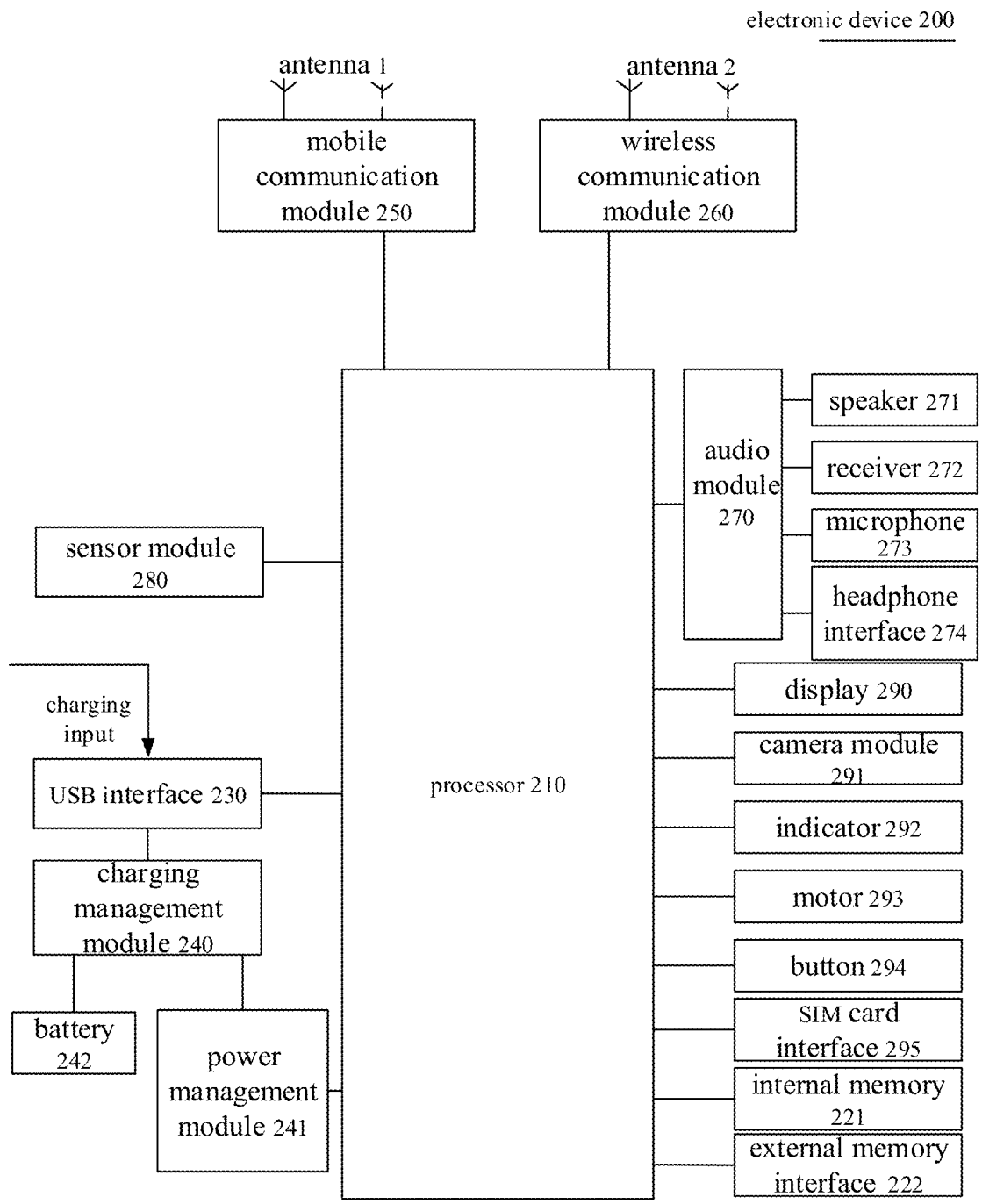
FIG. 2 is a structural schematic view of an electronic device suitable for implementing embodiments of the present disclosure according to some embodiments of the present disclosure.

FIG. 2 is a structural schematic view of an electronic device suitable for implementing embodiments of the present disclosure according to some embodiments of the present disclosure. It is noted that the electronic device shown in FIG. 2 is only an embodiment and should not bring any limitation to functions and an application scope of the embodiments of the present disclosure.

The electronic device of the present disclosure includes at least a processor and a memory. The memory is configured to store one or more programs, when the one or more programs are executed by the processor, the processor is caused to implement the object measurement method or the virtual object processing method of the embodiments of the present disclosure.

Specifically, as shown in FIG. 2, the electronic device 200 may include a processor 210, an internal memory 221, an external memory interface 222, a universal serial bus (USB) interface 230, a charging management module 240, a power management module 241, a battery 242, an antenna 1, an antenna 2, a mobile communication module 250, a wireless communication module 260, an audio module 270, a speaker 271, a receiver 272, a microphone 273, a headphone interface 274, a sensor module 280, a display 290, a camera module 291, an indicator 292, a motor 293, a button 294, and a subscriber identification module (SIM) card interface 295, etc. The sensor module 280 may include a depth sensor, a pressure sensor, a gyroscope sensor, a gas pressure sensor, a magnet sensor, an acceleration sensor, a distance sensor, a proximity light sensor, a fingerprint sensor, a temperature sensor, a touch sensor, an environment light sensor, and a bone conduction sensor, etc.

It will be understood that structures illustrated in the embodiments of the present disclosure do not make a specific limitation to the electronic device 200. In some embodiments of the present disclosure, the electronic device 200 may include more or fewer components than components shown in the drawings, or combining some components, or dividing some components, or having different arrangements of the components. The components shown in the drawings may be implemented as hardware, software, or a combination of the software and the hardware.

The processor 210 may include one or more processing units, for example, the processor 210 may include an Application Processor (AP), a modem processor, a Graphics Processing Unit (GPU), an Image Signal Processor (ISP), a controller, a video codec, a Digital Signal Processor (DSP), a baseband processor, and/or a Neural-network Processing Unit (NPU), etc. Different processing units may be independent devices or may be integrated in one or more processors. In addition, the memory may be arranged in the processor 210 and configured to store instructions and data.

The USB interface 230 is an interface conforming to a USB standard specification. Specifically, the USB interface 230 may be a MiniUSB interface, a MicroUSB interface, a USB Type C interface, etc. The USB interface 230 may be configured to be connected to a charger to charge the electronic device 200, or configured to transfer data between the electronic device 200 and a peripheral device. The USB interface 230 may also be configured to connect a headphone, and an audio may be played through the headphone. The USB interface may also be configured to connect other electronic devices, such as AR devices, etc.

The charging management module 240 is configured to receive a charging input from the charger. The charger may be a wireless charger or a wired charger. The power management module 241 is configured to be connected to the battery 242, the charging management module 240, and the processor 210. The power management module 241 receives an input from the battery 242 and/or an input from the charging management module 240 and supply power for the processor 210, the internal memory 221, the display 290, the camera module 291, and the wireless communication module 260, etc.

A wireless communication function of the electronic device 200 may be implemented by the antenna 1, the antenna 2, the mobile communication module 250, the wireless communication module 260, the modem processor, and the baseband processor, etc.

The mobile communication module 250 may provide a solution of wireless communications including 2G/3G/4G/5G, etc., applied to the electronic device 200.

The wireless communication module 260 may provide a solution of the wireless communications including a Wireless Local AreaNetwork (WLAN) (e.g., a Wireless Fidelity (Wi-Fi) network), a Bluetooth (BT), a Global Navigation Satellite System (GNSS), a Frequency Modulation (FM), a Near Field Communication (NFC), an Infrared (IR) technology, etc.

The electronic device 200 may implement a displaying functions through GPU, the display 290, and the AP, etc. The GPU is a microprocessor for image processing, and connected to the display 290 and the AP. The GPU is configured to perform a mathematical and geometric calculation for graphic rendering. The processor 210 may include one or more GPUs, and execute program instructions to generate or change display information.

The electronic device 200 may implement a capturing function through the ISP, the camera module 291, the video codec, the GPU, the display 290, and the AP. In some embodiments, the electronic device 200 may include 1 or N camera modules 291, and N is a positive integer greater than 1. When the electronic device 200 includes N cameras, one of the N cameras is a mother or primary camera.

The internal memory 221 may be configured to store computer executable program codes, and the executable program codes includes instructions. The internal memory 221 may include a program-storing region and a data-storing region. The external memory interface 222 may be configured to be connected to an external storage card, such as a micro SD card, to expand a storing capacity of the electronic device 200.

The electronic device 200 may implement an audio function through the audio module 270, the speaker 271, the receiver 272, the microphone 273, the headphone interface 274, and the AP. For example, the audio function may include playing music, recording, etc.

The audio module 270 is configured to convert digital audio information to an analog audio signal output. The audio module 270 is also configured to convert an analog audio input to a digital audio signal. The audio module 270 may also be configured to encode and decode an audio signal. In some embodiments, the audio module 270 may be arranged in the processor 210, or a part of functional modules of the audio module 270 may be arranged in the processor 210.

The speaker 271, also known as a "loudspeaker", is configured to convert an audio electrical signal into a sound signal. The electronic device 200 may listen to the music through the speaker 271, or listen to a hands-free call. The receiver 272, also known as a "handset", configured to convert the audio electrical signal to a sound signal. When the electronic device 200 answers a phone call or voice message, the receiver 272 may be put close to ears of the user to receive a voice. The microphone 273, also known as a "sound transmitter", is configured to convert the sound signal to an electrical signal. When making a call or sending the voice message, the user may make a sound through having a mouth of the user close to the microphone 273, input the sound signal into the microphone 273. The electronic device 200 may include at least one microphone 273. The headphone interface 274 is configured to be connected to a wired headset.

The sensor module 280 in the electronic device 200 may include the following sensors. The depth sensor is configured to acquire the depth information of a scenery. The pressure sensor is configured to sense a pressure signal, and convert the pressure signal into an electrical signal. The gyroscope sensor may be configured to determine a motion attitude of the electronic device 200. The gas sensor is configured to measure a gas pressure. The magnet sensor includes a Hall sensor. The electronic device 200 may detect an opening state and a closing state of a flap holster by means of the magnet sensor. The acceleration sensor may detect a magnitude of an acceleration of the electronic device 200 in each direction (generally indicating directions in three axes). The distance sensor is configured to measure a distance. The proximity light sensor may include, for example, a light emitting diode (LED) and a light detector, such as a photodiode. The fingerprint sensor is configured to capture a fingerprint. The temperature sensor is configured to detect a temperature. The touch sensor may transmit a detected touch operation to the AP to determine a type of a touch event. A visual output associated with the touch operation may be provided through the display 290. The environment light sensor is configured to sense a brightness of an environment light. The bone conduction sensor may acquire a vibration signal.

The button 294 include an on button, a volume button, etc. The button 294 may be a mechanical button or a touching button. The motor 293 may generate a vibration notification. The motor 293 may be configured for the vibration notification of an incoming call or a touch vibration feedback. The indicator 292 may be an indicator light, and configured to indicate a charging state, a power change, or indicate message, a missed call, a notification, etc. The SIM card interface 295 is configured to be connected a SIM card. The electronic device 200 interacts with a network through the SIM card to achieve a function such as calling and a data communication, or the like.

A computer-readable storage medium is provided in the present disclosure, which may be included in the electronic device described in the above embodiments, or may be arranged separately and not assembled into the electronic device.

The computer-readable storage medium may be, for example, but not limited to an electrical, a magnetic, an optical, an electromagnetic, an infrared, or a semiconductor system, apparatus, or device; or any combination of the above. More specifically, the computer-readable storage medium may include but be not limited to an electrical connection having one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic memory device, or any suitable combination of the foregoing. In the embodiments of the present disclosure, the computer-readable storage medium may be any tangible medium including or storing the program which may be used by or used in combination with an instruction executing system, device, or apparatus.

The computer-readable storage medium may send, propagate, or transmit the program used by or used in combination with the instruction executing system, device, or apparatus. Program codes stored in the computer-readable storage medium may be transmitted by any suitable medium, including but not limited to a wireless way, a wire way, a fiber optic cable way, an RF way, etc., or any suitable combination of the forgoing.

The computer-readable storage medium carries one or more programs, when the one or more programs are executed by the electronic device, the electronic device is caused to implement the method as described in the following embodiments.

The flowcharts and block diagrams in the accompanying drawings illustrate a system architecture, a function, and an operation which may be implemented based on a system, the method, and a computer program product in the embodiments of the present disclosure. Each block of the flowcharts or the block diagrams may present a module, a program segment, or a part of the codes. The module, the program segment, or the part of the codes may include one or more executable instructions configured to implement a specified logical function. It should also be noted that in some embodiments, the function indicated in each block may be implemented in a sequence different from a sequence indicated in the accompanying drawings. For example, two blocks connected shown may actually be implemented in substantially parallel, and may also sometimes be implemented in an opposite sequence relative to the sequence show in the drawings, depending on the functions involved. It also should be noted that each block in the block diagrams or the flowcharts, and a combination of the blocks in the block diagrams or the flowcharts, may be implemented by a dedicated hardware-based system configured to execute a specified function or operation, or may be implemented by a combination of a dedicated hardware and computer instructions.

The units described in the embodiments of the present disclosure may be implemented in a form of a software or in a form of a hardware. The units described may also be arranged in the processor. In a certain case, the names of these units are not limitations of these units.

In the following descriptions, all the RGB capturing apparatus, the depth sensing apparatus, and the infrared sensing apparatus have completed calibrations of camera parameters. A calibration process is not limited in the present disclosure. In addition, a time stamp of a captured RGB image, a time stamp of the depth image, and a time stamp of the infrared image are synchronized.

It should be noted that the number of objects existing in the scene is not limited. The measurement parameters of each object may be measured by means of the object measurement method in the following.

Figure 3:
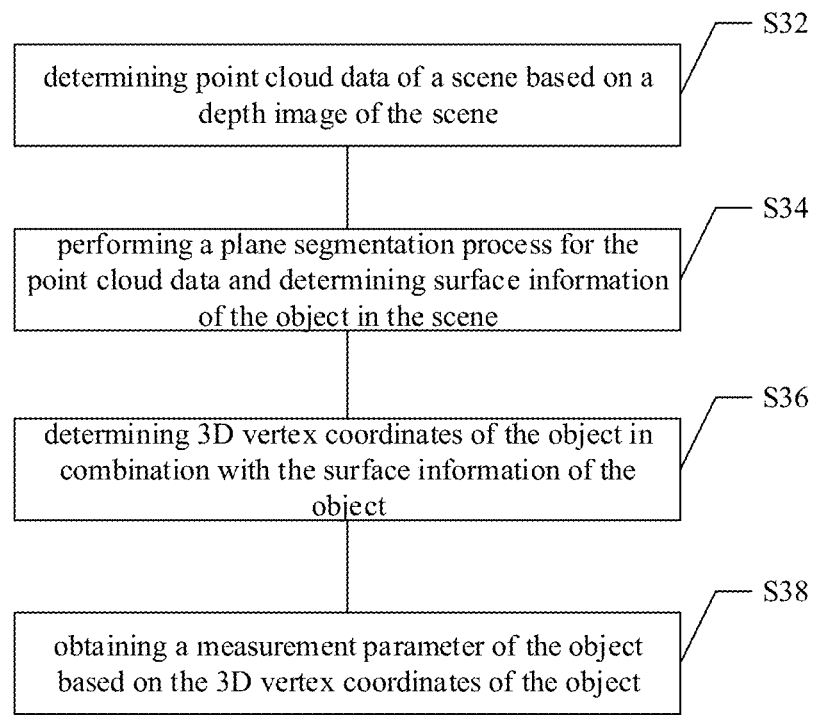
FIG. 3 is schematic flowchart of an object measurement method according to some embodiments of the present disclosure.

FIG. 3 is schematic flowchart of an object measurement method according to some embodiments of the present disclosure.

In an operation S32, the method includes determining point cloud data of a scene based on a depth image of the scene.

The scene described in the embodiments of the present disclosure refers to a real scene including an object, and a depth sensing apparatus equipped in an electronic device may sense the scene and obtain the depth image of the scene.

In a process of determining the point cloud data of the scene, the camera parameters of the depth sensing apparatus may be configured to perform calculations to obtain the point cloud data corresponding to the depth image.

First, the camera parameters of the depth sensing apparatus configured to capture the depth image may be acquired. The camera parameters may be specifically expressed as $$\begin{bmatrix} f_x & 0 & u_o \\ 0 & f_y & v_o \\ 0 & 0 & 1 \end{bmatrix}$$

$f_x$ and $f_y$ represents a focal length of a camera of the depth sensing apparatus, and $u_0$ and $v_0$ represents center coordinates of the depth image. A person skilled in the art may understand that $f_x$, $f_y$, $u_0$, and $v_0$ may be calculated in a calibration way.

The calibration process may be performed offline or online. For example, a linear calibration method (e.g., a Faugeras calibration method, etc.), a nonlinear optimized calibration method (e.g., a Levenberg-Marquadt algorithm, etc.), a two-operation calibration method (e.g., a Tsai two-operation method, a Zhengyou Zhang calibration algorithm, etc.), or other methods may be adopted to calculate $f_x$, $f_y$, $u_0$ and, $v_0$, which are not specifically limited in this embodiment.

Take Zhang Zhengyou calibration algorithm as an example, an image drawn with a checkerboard grid may be placed in front of the camera as a calibration image. Since four quantities need to be calculated, $f_x$, $f_y$, $u_0$, and $v_0$ may be linearly and uniquely solved by means of he Zhang Zhengyou calibration algorithm when at least three images are captured at different angles and positions.

In other words, in the embodiments of the present disclosure, at least three images mentioned above may be configured as calibration images, and the calibration images may be processed by means of the Zhang Zhengyou calibration algorithm, such that the camera parameters may be automatically calculated.

In addition, the calibration image may be other images except for the image drawn with the checkerboard grid, which is not specifically limited in this embodiment.

After the camera parameters of the depth sensing apparatus are determined, 3D data corresponding to the depth information may be calculated based on the camera parameters and the depth information of each pixel in the depth image. The 3D data is taken as the point cloud data of the scene. The following formula may be used to calculate the 3D data.

$$Z_c \begin{pmatrix} u \\ v \\ 1 \end{pmatrix} = \begin{bmatrix} f_x & 0 & u_o \\ 0 & f_y & v_o \\ 0 & 0 & 1 \end{bmatrix} [R \ T] \begin{bmatrix} X_w \\ Y_w \\ Z_w \\ 1 \end{bmatrix}$$

u and v are coordinate points of each pixel on the depth image, $Z_c$ is a z-axis value of the camera coordinates. Under a reference coordinate system of the depth sensing apparatus, R is a unit matrix and T is 0. In a case where $f_x$, $f_y$, $u_0$, $v_0$, and u, v, Zw are known, Xw and Yw may be solved, and Xw, Yw, and Zw are obtained and the 3D point cloud data of the scene may be generated.

In an operation S34, the method includes performing a plane segmentation process for the point cloud data and determining surface information of the object in the scene.

In some embodiments of the present disclosure, a random sample consensus (RANSAC) algorithm may be configured to perform the plane segmentation process for the point cloud data.

For example, a random sampling process is performed for the point cloud data, a plane fitting is performed for sampled depth points, a relative relationship between a fitted plane and the depth points is detected, and an eliminating process and an updating process are performed based on the relative relationship, so as to determine each plane information in the scene. The surface information of the object is obtained by combining the plane information with geometric constraint information of the object.

Taking the regular object as an example, the geometric constraint information described in the present disclosure may include, but be not limited to the planes or surfaces are intersected with each other (i.e., there is an overlapping point cloud), side surfaces perpendicular to placing surfaces (a ground surface or a table surface), or the like.

In some embodiments, before performing the plane segmentation process for the point cloud data, a denoising process may be performed for the point cloud data. For example, different types of filters may be configured to achieve the denoising process, which is not limited in the embodiments of the present disclosure.

In an operation S36, the method includes determining 3D vertex coordinates of the object in combination with the surface information of the object.

According to some embodiments of the present disclosure, when the depth image captured by the depth sensing apparatus is complete and accurate, the 3D vertex coordinates of the object may be determined directly based on the surface information of the object determined based on the plane segmentation process. For example, coordinates of four vertices of an upper surface of a rectangular body placed on the ground in the scene are determined. Combining a distance between the ground and the upper surface, the height information of the rectangular is obtained. Coordinates of 4 vertices of a lower surface of the rectangular body may be obtained based on the height information and a normal vector of the upper surface. In this way, the 3D vertex coordinates of the objected.

However, a problem that the depth image captured by the depth sensing apparatus is incomplete or inaccurate may exist. In this case, according to some embodiments of the present disclosure, the 3D vertex coordinates of the object may be calculated by combining the depth image and the infrared image.

An infrared sensing apparatus equipped in the electronic device may sense the scene, obtain an infrared image of the scene, and extract corner point-information of the object in the infrared image.

According to an embodiment of the present disclosure, before extracting the corner-point information of the object in the infrared image, a brightness-equalizing process may be performed for the infrared image, so as to reduce a possibility of the image being over dark or over bright. For example, a processing means such as a normalization process, a histogram equalizing process, or the like, may be adopted, such that the brightness of the infrared image may be distributed evenly, and an average brightness of each pixel of the infrared image may be greater than a brightness threshold.

According to an embodiment of the present disclosure, in a process of extracting corner-point information of the object in the infrared image, for example, a SUSAN corner-point detection algorithm may be configured to extract the corner-point information of the object in the infrared image. For example, based on a substantially circular template including several elements in a pixel filed, a value of a corner-point responding function may be calculated for an image grayscale of each pixel based on the template field. When the value is greater than a threshold and a local maximum value, a point corresponding to the value is determined to a corner point.

Since a problem of the corner points being extracted incompletely may exist in simply performing a corner-point extracting process, a straight line relationship in the infrared image may be configured to further determine the corner points.

According to another embodiment of the present disclosure, the corner-point extracting process may be performed for the infrared image, and the corner point obtained through the corner-point extracting process may be determined as first corner-point information of the infrared image. A straight line extracting process may be performed for the infrared image to obtain the straight line information of the infrared image. Specifically, the straight line information may be extracted from the infrared image by a Hough transforming method, a HOG feature extracting method, etc. Subsequently, an intersecting point between straight lines may be determined as second corner-point information of the infrared image from obtained straight line information.

For the first corner-point information and the second-corner-point information of the infrared image, redundant corner-point information may be eliminated to determine the corner-point information of the object in the infrared image.

Subsequently, the electronic device may determine the 3D vertex coordinates of the object based on the corner-point information of the object in the infrared image and the surface information of the object determined in the operation S34.

After obtaining the corner-point information of the object in the infrared image, the corner-point information may be configured to determine the 2D vertex coordinates of the object in the infrared image. To further make the 2D vertex coordinates accurate, the depth information and the geometric constraint information of the object may be configured to perform a constraining process. Specifically, a scope of a plane point cloud on the object may be determined based on the surface information of the object. A determined corner point may be constrained with the scope of the plane point cloud on the object and the geometric constraint information of the object as a constraining condition, so as to determine the 2D vertex coordinates of the object in the infrared image.

After obtaining the 2D vertex coordinates of the object in the infrared image, 3D vertex coordinates of the object in a coordinate system of the infrared sensing apparatus may be calculated based on the 2D vertex coordinates of the object in the infrared image and the camera parameters of the infrared sensing apparatus. A specific formula configured for calculating is similar to the formula in the operation S32, which is not repeated herein.

The 3D vertex coordinates of the object may be determined based on the 3D vertex coordinates of the object under the coordinate system of the infrared sensing apparatus and the surface information of the object.

Specifically, with coordinates of an optical center of the camera of the depth sensing apparatus configured to take the depth image as a starting point, a ray directed to the 3D vertex coordinates under the coordinate system of the infrared sensing apparatus may be constructed. In this way, the ray may have an intersecting point with a plane corresponding to the surface information of the object, and the intersecting point is determined as 3D vertex coordinates of the object under a coordinate system of the depth sensing apparatus. The 3D vertex coordinates of the object under the coordinate system of the depth sensing apparatus is determined the 3D vertex coordinates of the object determined in the operation S36.

A person skilled in the art may understand that a camera coordinate system of the depth sensing apparatus is the same as a camera coordinate system of the infrared sensing apparatus.

In an operation S38, the method may include obtaining measurement parameter of the object based on the 3D vertex coordinates of the object.

In some embodiments, measurement parameters of the object include one or more of length information, width information, height information, surface area information, or volume information of the object.

It is easy to be understood that the above measurement parameters may be obtained by a conventional calculation method when 3D vertices of the object are determined, and a specific process is not limited in some embodiments of the present disclosure.

According to some embodiments of the present disclosure, the 3D vertex coordinates determined in the operation S36 include 3D vertex coordinates of an upper surface of the object. In this case, the 3D vertex coordinates of the upper surface may be configured to calculate 3D vertex coordinates of a lower surface, and then the 3D vertex coordinates of the upper surface and the 3D vertex coordinates of the lower surface may be configured to obtain the measurement parameters of the object.

A process of calculating the 3D vertex coordinates of the lower surface of the object may be described in the following. A plane information of a plane (e.g., a ground surface or a table surface) where the object is placed is determined based on a result of the plane segmentation process for the point cloud data. Height information of the object is determined based on the plane information of the plane where the object is placed and surface information of the upper surface of the object. That is, a distance between two planes (i.e., the plane where the object is placed and a plane where the upper surface of the object is at) may be calculated, so as to obtain the height information of the object. Subsequently, the 3D vertex coordinates of the lower surface of the object may be calculated by combining the height information of the object, the 3D vertex coordinates of the upper surface of the object, and a normal vector of the upper surface of the object.

Based on the above object measurement method, in the present disclosure, the object may be automatically measured by means of the depth information of the scene. Compared to a deep learning solution, it is not required to collect a large amount of information of objects for training in some embodiments of the present disclosure. A possibility of a measurement result of an object which is not pre-trained being inaccurate may be reduced, such that robustness and an applicable scope of the object measurement method may be further improved. In addition, in some embodiments of the present disclosure, the infrared image is combined, such that an accuracy of identifying the 3D vertex coordinates of the object may be improved, and obtained measurement parameters may be more accurate.

A solution of achieving generating and displaying a visual object by the above object measurement method is also provided in some embodiments of the present disclosure. Specifically, a virtual object processing method is provided in some embodiments of the present disclosure, and applied to an electronic device capable of displaying the virtual object.

Figure 4:
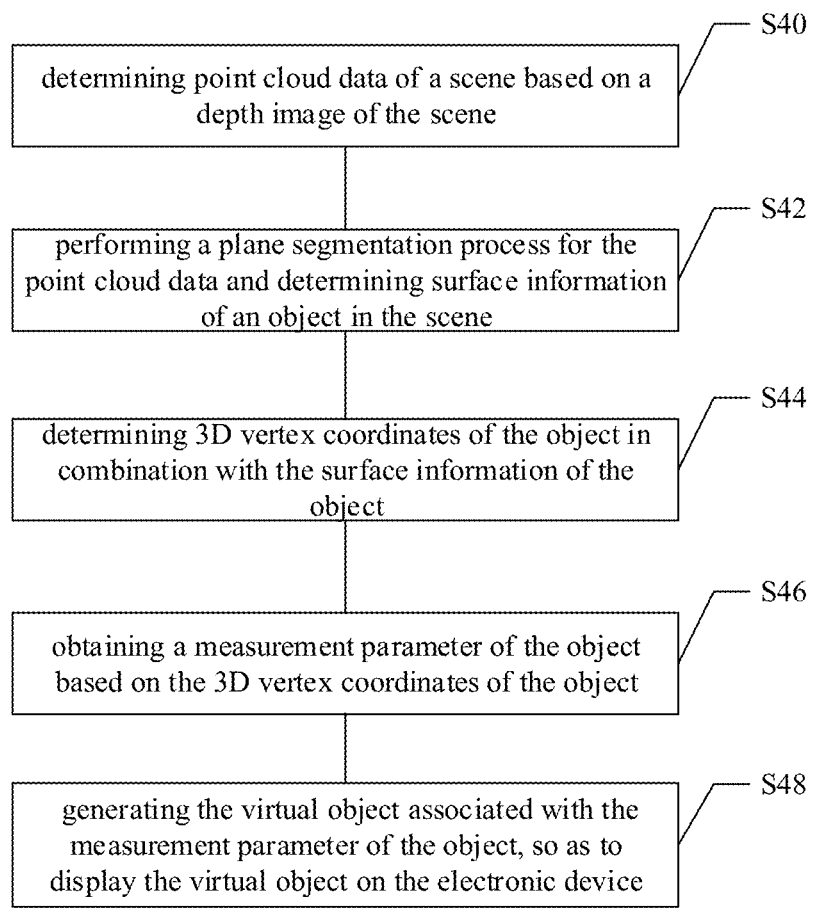
FIG. 4 is a schematic flowchart of a virtual object processing method according to some embodiments of the present disclosure.

As shown in FIG. 4, the virtual object processing method according to some embodiments of the present disclosure may include the following operations.

In an operation S40, the method may include determining point cloud data of a scene based on a depth image of the scene.

In an operation S42, the method may include performing a plane segmentation process for the point cloud data and determining surface information of an object in the scene.

In an operation S44, the method may include determining 3D vertex coordinates of the object in combination with the surface information of the object.

In an operation S46, the method may include obtaining a measurement parameter of the object based on the 3D vertex coordinates of the object.

In an operation S48, the method may include generating the virtual object associated with the measurement parameter of the object, so as to display the virtual object on the electronic device.

Operations S40 to S46 are implemented in the same manner as operations S32 to S38 described above, which will not be repeated herein.

According to some embodiments of the present disclosure, the virtual object includes a 3D virtual frame corresponding to the object. In this case, a process of generating the virtual object associated with the measurement parameter of the object in the operation S48 includes the following. The 3D vertex coordinates of the object are acquired, and the 3D vertex coordinates of the object are converted to the 3D coordinates under an augmented reality platform coordinate system.

Specifically, posture information of an RGB image may be obtained based on the RGB image captured by an RGB capturing apparatus and inertial data detected by the IMU. A timestamp of the RGB image is the same as a timestamp of a depth image configured to determine the 3D vertex coordinates of the object.

In a case where a camera parameter of the RGB capturing apparatus and a camera parameter of the depth sensing apparatus are obtained, the 3D vertex coordinates of the object may be converted to 3D coordinates under a coordinate system of the RGB capturing apparatus based on the posture information of the RGB image, the camera parameter of the RGB capturing apparatus, and the camera parameter of the depth sensing apparatus, and the D vertex coordinates may be determined as the 3D coordinates under the augmented reality platform coordinate system. A specific converting process may involve a converting process between 3D data and 2D data, and the formula in the operation S32 may be referred to for details, which is not repeated herein.

After determining the 3D coordinates of the object in the augmented reality platform coordinate system, the 3D virtual frame corresponding to the object may be generated by a rendering process through a geometric constrain of the object.

In an embodiment, after the user performing an operation (e.g., clicking the object, long-pressing the object, etc.) related to virtual object displaying in the interface of the electronic device, the 3D virtual frame may be displayed on the interface.

According to some embodiments of the present disclosure, the virtual object may be a virtual text generated after converting the measurement parameter.

It should be noted that the number of the virtual object generated in the operation S48 may be one or more. For example, the virtual object may include both the 3D virtual frame and the virtual text.

Figure 5:
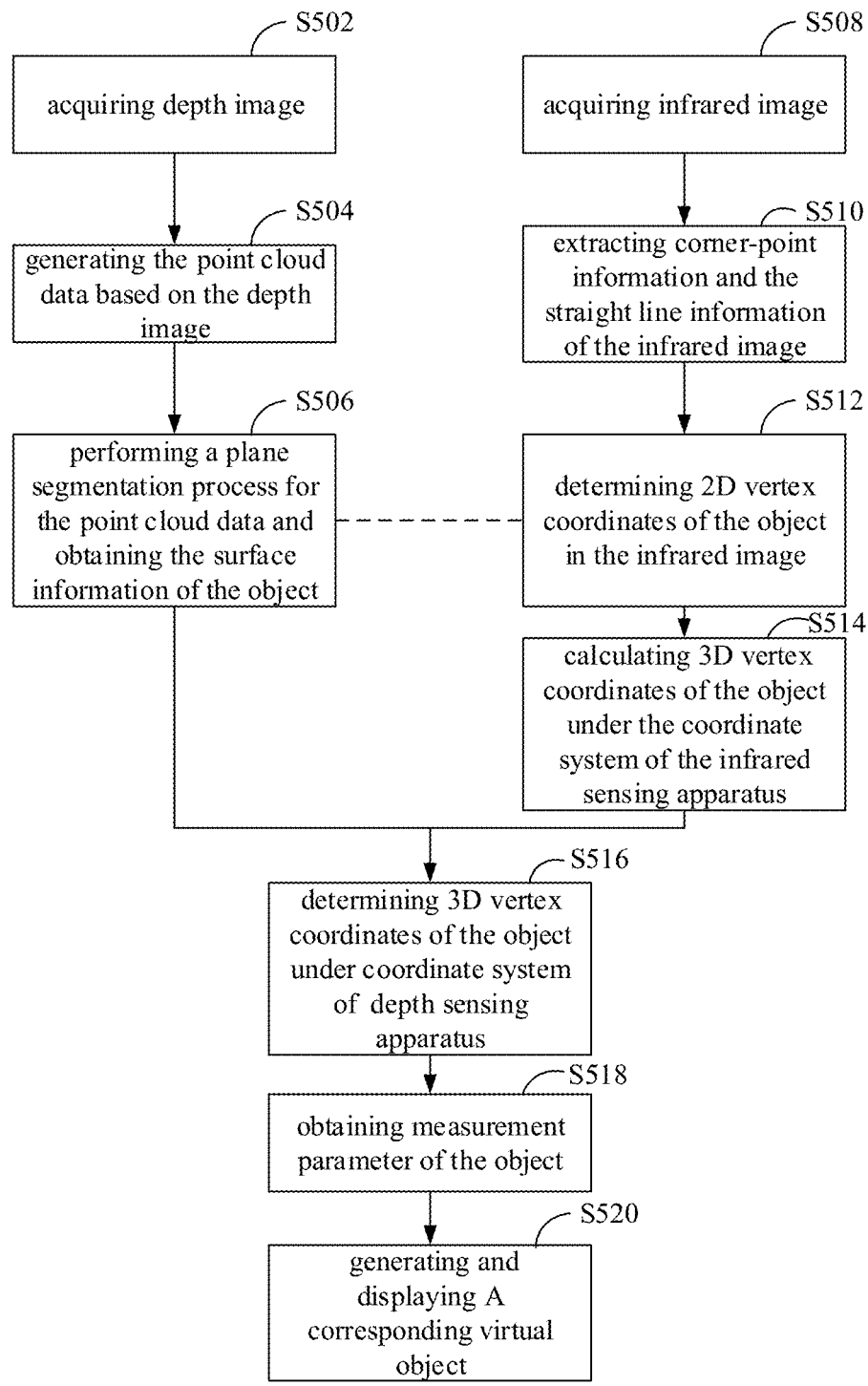
FIG. 5 is a schematic flowchart of an entire AR measuring process according to an embodiment of the present disclosure.

An AR measuring process according to an embodiment of the present disclosure will be described in the following with reference to FIG. 5.

In an operation S502, the depth image of the scene captured by the depth sensing apparatus is acquired. In an operation S504, based on the camera parameter of the depth sensing apparatus, the depth image is configured to generate the point cloud data. In an operation S506, the plane segmentation process is performed for the point cloud data and the surface information of the object in the scene is obtained.

In an operation S508, the infrared image of the scene captured by the infrared sensing apparatus is acquired. In an operation S510, the corner-point information and the straight line information of the infrared image may be extracted. In an operation S512, the 2D vertex coordinates of the object in the infrared image are determined based on the corner-point information and the straight line information which are extracted. In addition, during determining the 2D vertex coordinates of the object in the infrared image, depth point cloud data may be configured to perform the constraining process, such that the determined vertex coordinates may be more accurate. In an operation S514, the 3D vertex coordinates of the object under the coordinate system of the infrared sensing apparatus may be calculated based on the 2D vertex coordinates and the camera parameter of the infrared sensing apparatus.

In an operation S516, the 3D vertex coordinates of the object under the coordinate system of the depth sensing apparatus may be determined based on the surface information of the object determined based on the depth image and the 3D vertex coordinates under the coordinate system of the infrared sensing apparatus.

In an operation S518, the measurement parameter of the object is obtained based on the 3D vertex coordinates of the object.

In an operation S520, the virtual object associated with the measurement parameter of the object is generated and displayed on an application interface of the electronic device.

Figure 6:
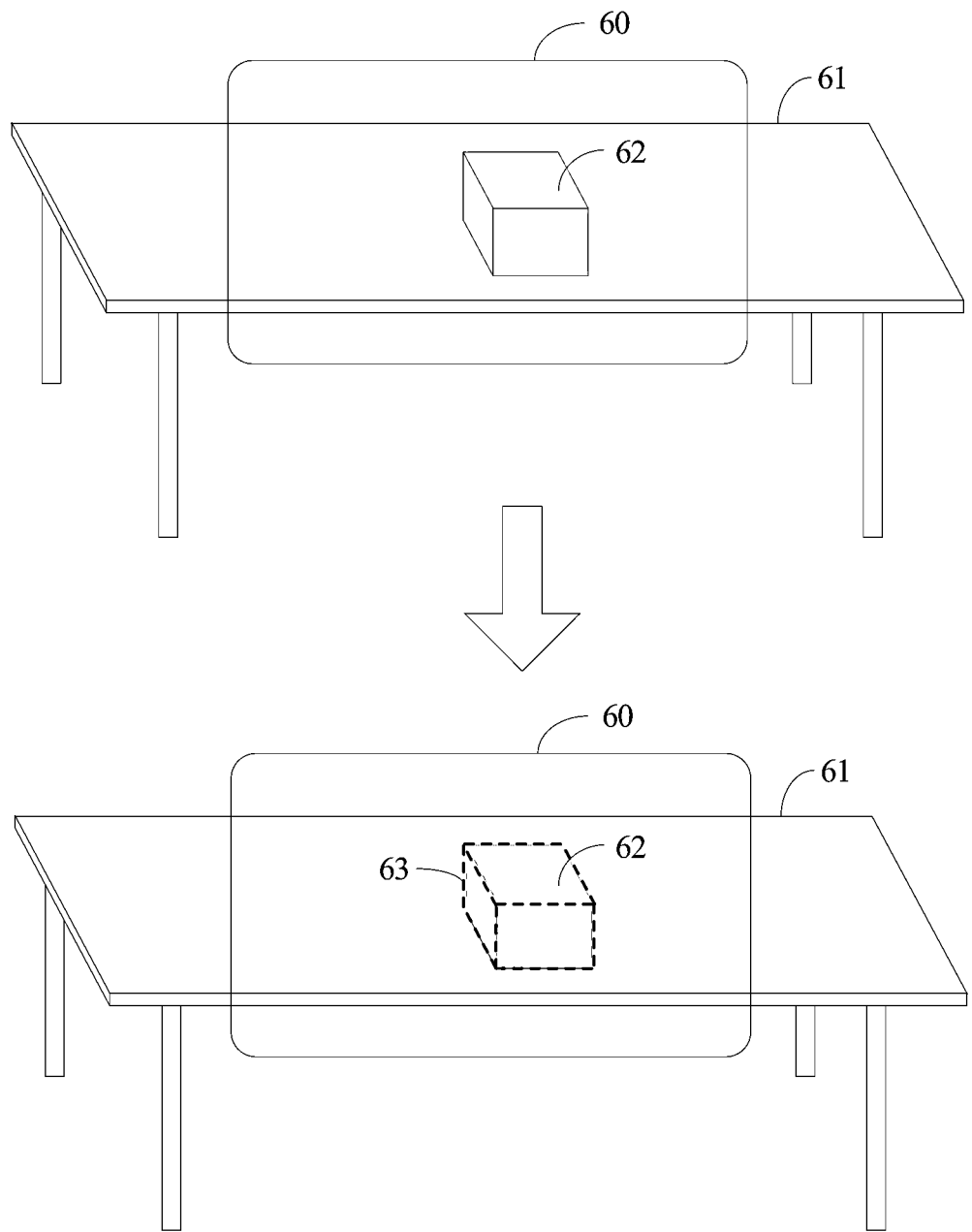
FIG. 6 is a schematic diagram of a displaying effect after performing the AR measuring process according to an embodiment of the present disclosure.

FIG. 6 is a schematic diagram of a displaying effect after performing the AR measuring process according to an embodiment of the present disclosure. As shown in FIG. 6, a rectangular box 62 is placed on a table 61. After the electronic device 60 initiates an AR measurement application and executes the virtual object processing method described above, a 3D frame 63 of the box 62 may be displayed on the application interface of the electronic device 60. In addition, the 3D frame 63 may be configured to be in various colors and styles through the rendering process.

It should be understood that the 3D frame 63 is configured in an anchor-point manner. Regardless of a viewing angle of the user changing, i.e., regardless of the electronic device 60 moving, a relative position of the 3D frame 63 to the box 62 is fixed and unchanged.

Figure 7:
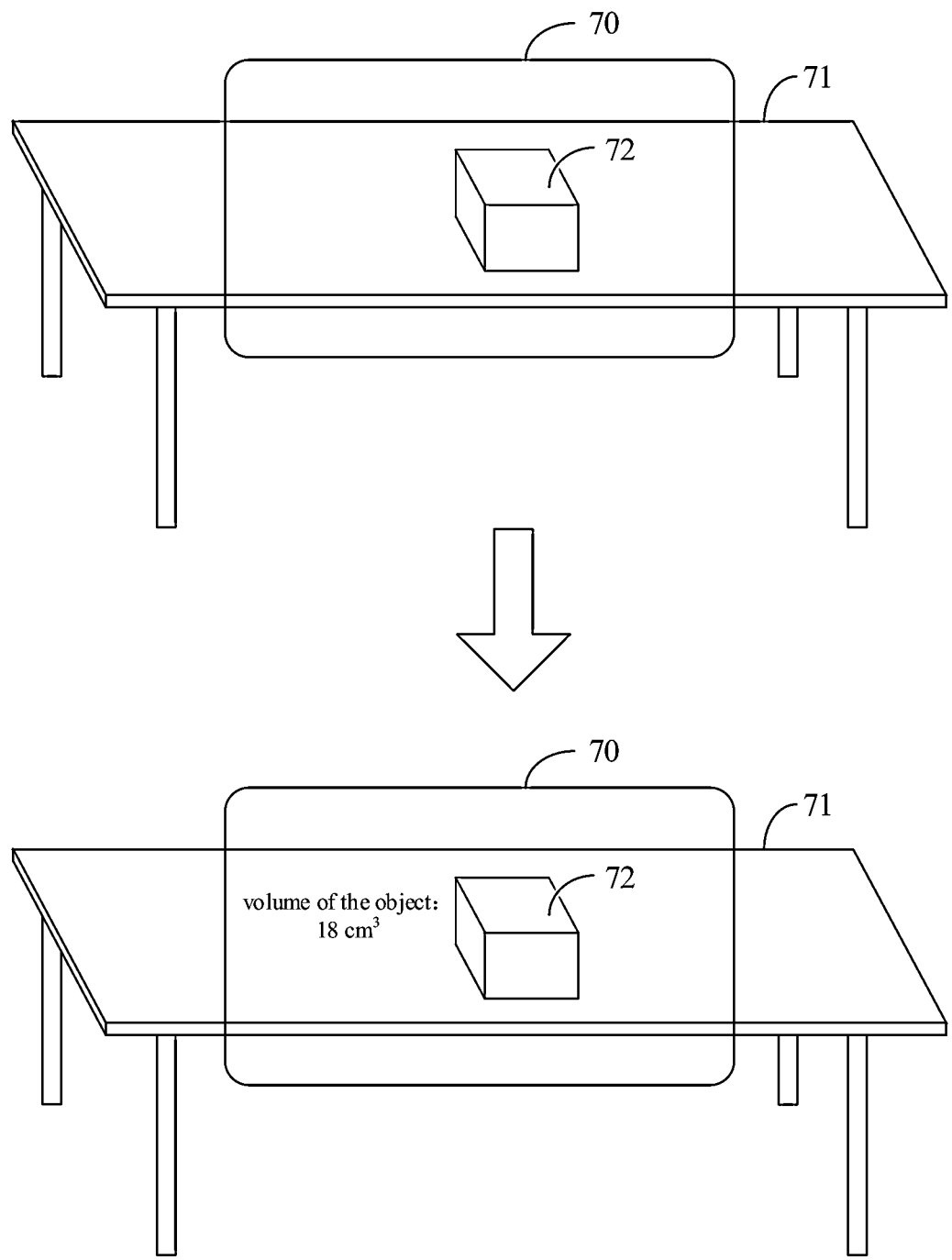
FIG. 7 is a schematic diagram of the displaying effect after performing the AR measuring process according to another embodiment of the present disclosure.

FIG. 7 is a schematic diagram of the displaying effect after performing the AR measuring process according to another embodiment of the present disclosure. As shown in FIG. 7, a rectangular box 72 is placed on a table 71. After the electronic device 70 initiates the AR measurement application and executes the virtual object processing method described above, a virtual text of measurement parameters corresponding to the box 72 may be displayed on the application interface of the electronic device 70. As shown in FIG. 7, the virtual text, for example, is "volume of the object: 18 cm$^3$". In addition, the virtual text may be configured in various colors and patterns through the rendering process.

In some embodiments of the present disclosure, in order to avoid the virtual object from obscuring other objects which may be in the scene, the electronic device may also perform a detecting process for the environment around the object. When a predetermined type of object is detected, the visual object is displayed in a way of avoiding the predetermined type of object. The predetermined type may be set by the user. The detecting process may be achieved by means of a classification model of the deep learning, which is not limited in the present disclosure.

In some embodiments, when the electronic device determines that the measurement parameters of the object meet preset requirements, the above virtual object is displayed while another virtual object is configured around the above virtual object, which may increase interest or realize a configuration of an AR game. For example, in the case that the upper surface of the object has an area greater than an area threshold, a visual cotton character may be configured on the upper surface of the object, and the user may also control the virtual cartoon character to display various actions such as walking, jumping, waving, etc, by means of a widget on the interface.

Based on the above virtual object processing method, on the one hand, the virtual object associated with the measurement parameters of the object is generated and displayed, such that the user may intuitively obtain the information related to the measurement parameters of the object. A whole process is performed automatically, which is convenient and quick, and the user is not required to manually measure and record a measurement result. on the other hand, the interest of the AR application may be increased by configuring the visual object.

It should be noted that, although each of the operations of the method in the present disclosure is described in the accompanying drawings in a particular sequence, it is not required or implied that the operations must be performed in the particular sequence or that all of the operations shown must be performed to achieve a desired result. In some embodiments, some operations may be omitted, multiple operations may be combined into one operation to be executed, and/or one operation may be divided into multiple operations to be executed, etc.

An object measurement apparatus is provided in some embodiments of the present disclosure.

Figure 8:
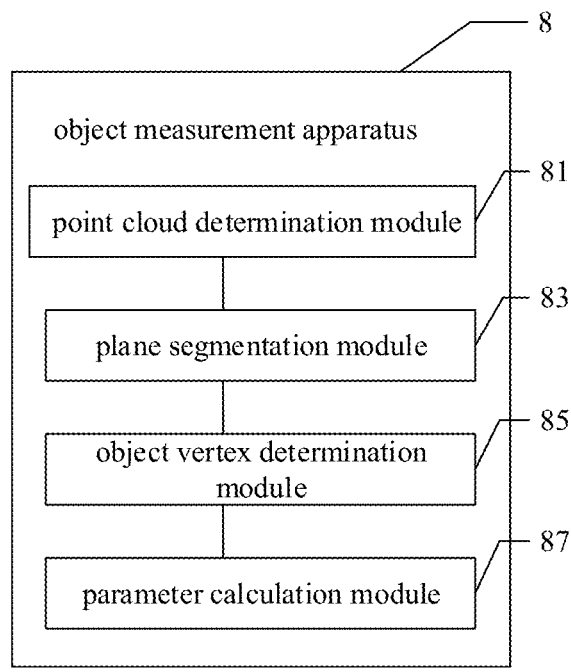
FIG. 8 is a schematic view of an object measurement apparatus according to some embodiments of the present disclosure.

FIG. 8 is a schematic view of an object measurement apparatus according to some embodiments of the present disclosure. As shown in FIG. 8, the object measurement apparatus 8 includes a point cloud determination module 81, a plane segmentation module 83, an object vertex determination module 85, and a parameter calculation module 87.

Specifically, the point cloud determination module 81 is configured to acquire a depth image of a scene and determine point cloud data of the scene based on the depth image. The plane segmentation module 83 is configured to perform a plane segmentation process for the point cloud data and determining surface information of an object in the scene. The object vertex determination module 85 is configured to determine 3D vertex coordinates of the object in combination with the surface information of the object. The parameter calculation module 87 is configured to obtain a measurement parameter of the object based on the 3D vertex coordinates of the object.

In some embodiments, the object vertex determination module 85 is configured to acquire an infrared image of the scene and extract corner-point information of the object in the infrared image; and determine the 3D vertex coordinates of the object based on the corner-point information of the object in the infrared image and the surface information of the object.

In some embodiments, in a process of extracting the corner-point information of the object in the infrared image, the object vertex determination module 85 is configured to perform a corner-point extracting process for the infrared image to obtain a first corner-point information of the infrared image; perform a straight-line extracting process for the infrared image to obtain straight-line information of the infrared image; determine second corner-point information of the infrared image based on the straight-line information of the infrared image; and combine the first corner-point information and the second corner-point information of the infrared image and determine the corner-point information of the object in the infrared image.

In some embodiments, in a process of determining the 3D vertex coordinates of the object based on the corner-point information of the object in the infrared image and the surface information of the object, the object vertex determination module 85 is configured to determine a scope of a plane point cloud on the object based on the surface information of the object; and determine the 2D vertex coordinates of the object in the infrared image based on the corner-point information of the object in the infrared image, the scope of the plane point cloud on the object, and geometric constraint information of the object.

In some embodiments, in a process of determining the 3D vertex coordinates of the object, the object vertex determination module 85 is configured to calculate 3D vertex coordinates of the object under a coordinate system of the infrared sensing apparatus based on the 2D vertex coordinates of the object in the infrared image and the camera parameter of the infrared sensing apparatus; construct a ray directed to the 3D vertex coordinates under the coordinate system of the infrared sensing apparatus with coordinates of an optical center of a camera of a depth sensing apparatus configured to take the depth image as a starting point; and determine an intersection of the ray and a plane corresponding to the surface information of the object as 3D vertex coordinates of the object under a coordinate system of the depth sensing apparatus, and determine the 3D vertex coordinates of the object under the coordinate system of the depth sensing apparatus as the 3D vertex coordinates of the object. A camera coordinate system of the depth sensing apparatus is the same as a camera coordinate system of the infrared sensing apparatus.

In some embodiments, before the process of extracting the corner-point information of the object in the infrared image, the object vertex determination module 85 is configured to perform a brightness-equalizing process for the infrared image.

In some embodiments, the 3D vertex coordinates of the object include 3D vertex coordinates of an upper surface of the object. In this case, the parameter calculation module 87 is configured to determine a plane information of a plane where the object is placed based on a result of the plane segmentation process for the point cloud data; calculate height information of the object based on the plane information of the plane where the object is placed and surface information of the upper surface of the object; calculate 3D vertex coordinates of a lower surface of the object by combining the height information of the object, the 3D vertex coordinates of the upper surface of the object, and a normal vector of the upper surface of the object; and obtain the measurement parameter of the object based on the 3D vertex coordinates of the upper surface of the object and the 3D vertex coordinates of the lower surface of the object.

In some embodiments, the measurement parameters of the object include one or more of length information, width information, height information, surface area information, or volume information of the object.

In some embodiments, the point cloud determination module 81 is configured to acquire a camera parameter of a depth sensing apparatus configured to capture the depth image; and calculate 3D data corresponding to depth information of each pixel of the depth image as the point cloud data of the scene based on the camera parameters of the depth sensing apparatus configured to take the depth image and the depth information.

Since details of each functional module of the object measurement apparatus in above embodiments of the present disclosure are the same as descriptions in the method embodiments described above, which are not repeated herein.

A virtual object processing device is provided in some embodiments of the present disclosure, and is applied to an electronic device capable of displaying the virtual object.

Figure 9:
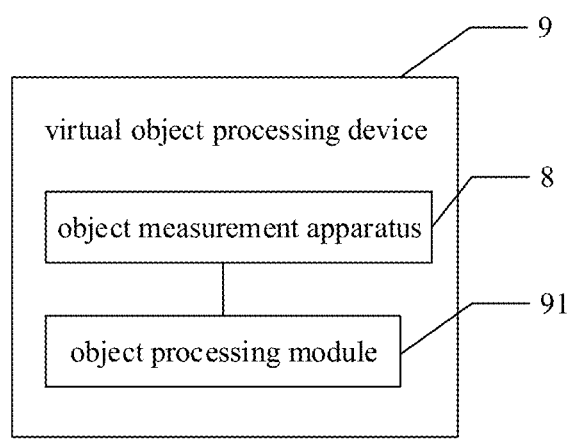
FIG. 9 is a schematic view of a virtual object processing apparatus according to some embodiments of the present disclosure.

FIG. 9 is a schematic view of a virtual object processing apparatus according to some embodiments of the present disclosure. As shown in FIG. 9, the virtual object processing device 9 includes an object measurement apparatus 8 and an object processing module 91 described above.

The object measurement apparatus 8 is not described in detail. the object processing module 91 is configured to generate the virtual object associated with the measurement parameter of the object, so as to display the virtual object on the electronic device.

In some embodiments, the virtual object includes a 3D virtual frame corresponding to the object, and object processing module is configured to acquire 3D vertex coordinates of the object; convert the 3D vertex coordinates of the object into 3D coordinates under an augmented reality platform coordinate system; and generate the 3D virtual frame corresponding to the object based on the 3D coordinates under the augmented reality platform coordinate system by a rendering process.

In some embodiments, in a process of converting the 3D vertex coordinates of the object into the 3D coordinates under the augmented reality platform coordinate system, the object processing module 91 is configured to acquire posture information of an RGB image; a timestamp of the RGB image being the same as a timestamp of a depth image configured to determine the 3D vertex coordinates of the object; obtain a camera parameter of an RGB capturing apparatus configured to capture the RGB image, and a camera parameter of a depth sensing apparatus configured to capture the depth image; and convert the 3D vertex coordinates of the object to 3D coordinates under a coordinate system of the RGB capturing apparatus based on the posture information of the RGB image, the camera parameter of the RGB capturing apparatus, and the camera parameter of the depth sensing apparatus, and obtain the 3D coordinates under the augmented reality platform coordinate system.

Since details of each functional module of the virtual object processing apparatus in above embodiments of the present disclosure are the same as descriptions in the method embodiments described above, which are not repeated herein.

Based on the above descriptions, it may be easy for one of ordinary skill in the art to understand the embodiments described herein may be implemented by means of a software, or in a way of the software combining a necessary hardware. Accordingly, a technical solution according to embodiments of the present disclosure may be embodied in a form of a software product. The software product may be stored in a non-volatile storage medium (such as a CD-ROM, a USB stick, a removable hard disk, etc.) or in a network, and include a number of instructions to enable a computing device (e.g., a personal computer, a server, a terminal device, or a network device, etc.) to perform the method according to embodiments of the present disclosure.

The accompanying drawings are merely schematic illustrations of the operations included in the method according to the embodiments of the present disclosure, and are not intended to be limitations to the present disclosure. It is readily understood that the operations shown in the accompanying drawings does not indicate or limit a chronological sequence of these operations. These operations may be performed, for example, in multiple modules, synchronously or asynchronously.

It should be noted that although some modules or units of the device configured to perform the operations are described in the above detailed descriptions, a division for these modules or units are not mandatory. In fact, according to the embodiments of the present disclosure, features and functions of two or more modules or units described above may be specified in a single module or unit. Conversely, features and functions of one module or unit described above may be specified by dividing the module or unit into multiple modules or units.

After those skilled in the art considers the specification and practices the embodiments described, other embodiments of the present disclosure may be readily obtained. The present disclosure is intended to cover any variation, application, and adaptively change of the present disclosure. These variation, application, and adaptively change follow a general principle of the present disclosure and include common knowledge and customary technical means in the art which are not disclosed herein. The specification and embodiments are simply exemplary, and a true scope and spirit of the disclosure are indicated by claims.

It should be understood that the present disclosure is not limited to a precise structure described above and illustrated in the accompanying drawings, and various modifications and changes may be made without departing from the scope of the present disclosure. The scope of the present disclosure is only limited by the appended claims.

What is claimed is:

1. An object measurement method, applied to an electronic device capable of displaying a virtual object, comprising:
    determining point cloud data of a scene based on a depth image of the scene;
    performing a plane segmentation process for the point cloud data and determining surface information of an object in the scene;
    determining 3D vertex coordinates of the object in combination with the surface information of the object; and
    obtaining a measurement parameter of the object based on the 3D vertex coordinates of the object;
    wherein determining the 3D vertex coordinates of the object in combination with the surface information of the object comprises:
        acquiring an infrared image of the scene, and extracting corner-point information of the object in the infrared image; and
        determining the 3D vertex coordinates of the object based on the corner-point information of the object in the infrared image and the surface information of the object;
    wherein determining the 3D vertex coordinates of the object based on the corner-point information of the object in the infrared image and the surface information of the object, comprises:
        determining 2D vertex coordinates of the object in the infrared image based on the corner-point information of the object in the infrared image;
        determining the 3D vertex coordinates of the object based on the 2D vertex coordinates of the object in the infrared image, a camera parameter of an infrared sensing apparatus configured for taking the infrared image, and the surface information of the object generating the virtual object associated with the measurement parameter of the object, so as to display the object on the electronic device.

2. The object measurement method according to claim 1, wherein extracting the corner-point information of the object in the infrared image comprises:
    performing a corner-point extracting process for the infrared image to obtain a first corner-point information of the infrared image;
    performing a straight-line extracting process for the infrared image to obtain straight-line information of the infrared image;
    determining second corner-point information of the infrared image based on the straight-line information of the infrared image; and
    combining the first corner-point information and the second corner-point information of the infrared image and determining the corner-point information of the object in the infrared image.

3. The object measurement method according to claim 1, wherein determining the 2D vertex coordinates of the object in the infrared image in combination with the corner-point information of the object in the infrared image comprises:
    determining a scope of a plane point cloud on the object based on the surface information of the object; and
    determining the 2D vertex coordinates of the object in the infrared image based on the corner-point information of the object in the infrared image, the scope of the plane point cloud on the object, and geometric constraint information of the object.

4. The object measurement method according to claim 1, wherein determining the 3D vertex coordinates of the object based on the 2D vertex coordinates of the object in the infrared image, the camera parameter of the infrared sensing apparatus configured for taking the infrared image, and the surface information of the object comprises:
    calculating 3D vertex coordinates of the object under a coordinate system of the infrared sensing apparatus based on the 2D vertex coordinates of the object in the infrared image and the camera parameter of the infrared sensing apparatus;
    constructing a ray directed to the 3D vertex coordinates under the coordinate system of the infrared sensing apparatus with coordinates of an optical center of a camera of a depth sensing apparatus configured to take the depth image as a starting point; and
    determining an intersection of the ray and a plane corresponding to the surface information of the object as 3D vertex coordinates of the object under a coordinate system of the depth sensing apparatus, and determining the 3D vertex coordinates of the object under the coordinate system of the depth sensing apparatus as the 3D vertex coordinates of the object;
    wherein a camera coordinate system of the depth sensing apparatus is the same as a camera coordinate system of the infrared sensing apparatus.

5. The object measurement method according to claim 1, wherein before extracting the corner-point information of the object in the infrared image, the method further comprises:
    performing a brightness-equalizing process for the infrared image.

6. The object measurement method according to claim 1, wherein the 3D vertex coordinates of the object comprise the 3D vertex coordinates of the upper surface of the object, and calculating the measurement parameter of the object based on the 3D vertex coordinates of the object comprises:
    determining a plane information of a plane where the object is placed based on a result of the plane segmentation process for the point cloud data;

calculating height information of the object based on the plane information of the plane where the object is placed and surface information of the upper surface of the object;

calculating 3D vertex coordinates of a lower surface of the object by combining the height information of the object, the 3D vertex coordinates of the upper surface of the object, and a normal vector of the upper surface of the object; and calculating the measurement parameter of the object based on the 3D vertex coordinates of the upper surface of the object and the 3D vertex coordinates of the lower surface of the object.

7. The object measurement method according to claim 6, wherein measurement parameters of the object comprise one or more of length information, width information, height information, surface area information, or volume information of the object.

8. The object measurement method according to claim 1, wherein determining the point cloud data of the scene based on the depth image comprises:

acquiring a camera parameter of a depth sensing apparatus configured to capture the depth image; and calculating 3D data corresponding to depth information of each pixel of the depth image as the point cloud data of the scene based on the camera parameters of the depth sensing apparatus configured to take the depth image and the depth information.

9. A virtual object processing method, applied to an electronic device capable of displaying the virtual object, comprising:

measuring a measurement parameter of an object in a scene, comprising:

determining point cloud data of a scene based on a depth image of the scene;

performing a plane segmentation process for the point cloud data and determining surface information of an object in the scene;

determining 3D vertex coordinates of the object in combination with the surface information of the object; and obtaining a measurement parameter of the object based on the 3D vertex coordinates of the object;

wherein determining the 3D vertex coordinates of the object in combination with the surface information of the object comprises:

acquiring an infrared image of the scene, and extracting corner-point information of the object in the infrared image; and determining the 3D vertex coordinates of the object based on the corner-point information of the object in the infrared image and the surface information of the object;

wherein determining the 3D vertex coordinates of the object based on the corner-point information of the object in the infrared image and the surface information of the object, comprises:

determining 2D vertex coordinates of the object in the infrared image based on the corner-point information of the object in the infrared image; and determining the 3D vertex coordinates of the object based on the 2D vertex coordinates of the object in the infrared image, a camera parameter of an infrared sensing apparatus configured for taking the infrared image, and the surface information of the object; and generating the virtual object associated with the measurement parameter of the object, so as to display the virtual object on the electronic device.

10. The virtual object processing method according to claim 9, wherein the virtual object comprises a 3D virtual frame corresponding to the object, and generating the virtual object associated with the measurement parameter of the object comprises:

acquiring the 3D vertex coordinates of the object;

converting the 3D vertex coordinates of the object to 3D coordinates under an augmented reality platform coordinate system; and generating the 3D virtual frame corresponding to the object based on the 3D coordinates under the augmented reality platform coordinate system by a rendering process.

11. The virtual object processing method according to claim 10, wherein converting the 3D vertex coordinates of the object to 3D coordinates under the augmented reality platform coordinate system comprises:

acquiring posture information of an RGB image; wherein a timestamp of the RGB image is the same as a timestamp of a depth image configured to determine the 3D vertex coordinates of the object;

obtaining a camera parameter of an RGB capturing apparatus configured to capture the RGB image, and a camera parameter of a depth sensing apparatus configured to capture the depth image; and converting the 3D vertex coordinates of the object to 3D coordinates under a coordinate system of the RGB capturing apparatus based on the posture information of the RGB image, the camera parameter of the RGB capturing apparatus, and the camera parameter of the depth sensing apparatus, and obtaining the 3D coordinates under the augmented reality platform coordinate system.

12. An electronic device, comprising:

a processor; and a memory, configured to store one or more programs, which when executed by the processor, configures the processor to implement an object measurement method, comprising:

determining point cloud data of a scene based on a depth image of the scene;

performing a plane segmentation process for the point cloud data and determining surface information of an object in the scene;

determining 3D vertex coordinates of the object in combination with the surface information of the object; and obtaining a measurement parameter of the object based on the 3D vertex coordinates of the object;

wherein determining 3D vertex coordinates of the object in combination with the surface information of the object comprises:

acquiring an infrared image of the scene, and extracting corner-point information of the object in the infrared image; and determining the 3D vertex coordinates of the object based on the corner-point information of the object in the infrared image and the surface information of the object;

wherein determining the 3D vertex coordinates of the object based on the corner-point information of the object in the infrared image and the surface information of the object, comprises:

determining 2D vertex coordinates of the object in the infrared image based on the corner-point information of the object in the infrared image;

determining the 3D vertex coordinates of the object based on the 2D vertex coordinates of the object in the infrared image, a camera parameter of an infrared sensing apparatus configured for taking the infrared image, and the surface information of the object generating the virtual object associated with the measurement parameter of the object, so as to display the object on the electronic device.

13. The electronic device according to claim 12, wherein in extracting the corner-point information of the object in the infrared image, the processor is further configured to implement:

performing a corner-point extracting process for the infrared image to obtain a first corner-point information of the infrared image;

performing a straight-line extracting process for the infrared image to obtain straight-line information of the infrared image;

determining second corner-point information of the infrared image based on the straight-line information of the infrared image; and combining the first corner-point information and the second corner-point information of the infrared image and determining the corner-point information of the object in the infrared image.

14. The electronic device according to claim 12, wherein the virtual object comprises a 3D virtual frame corresponding to the object, and in the generating the virtual object associated with the measurement parameter of the object, the processor is further configured to implement:

acquiring the 3D vertex coordinates of the object;

converting the 3D vertex coordinates of the object to 3D coordinates under an augmented reality platform coordinate system; and generating the 3D virtual frame corresponding to the object based on the 3D coordinates under the augmented reality platform coordinate system by a rendering process.

15. The electronic device according to claim 12, wherein in converting the 3D vertex coordinates of the object to 3D coordinates under the augmented reality platform coordinate system, the processor is further configured to implement:

acquiring posture information of an RGB image; wherein a timestamp of the RGB image is the same as a timestamp of a depth image configured to determine the 3D vertex coordinates of the object;

obtaining a camera parameter of an RGB capturing apparatus configured to capture the RGB image, and a camera parameter of a depth sensing apparatus configured to capture the depth image; and converting the 3D vertex coordinates of the object to 3D coordinates under a coordinate system of the RGB capturing apparatus based on the posture information of the RGB image, the camera parameter of the RGB capturing apparatus, and the camera parameter of the depth sensing apparatus, and obtaining the 3D coordinates under the augmented reality platform coordinate system.

* * * * *